(12) United States Patent
Botz et al.

(10) Patent No.: US 8,220,040 B2
(45) Date of Patent: Jul. 10, 2012

(54) VERIFYING THAT GROUP MEMBERSHIP REQUIREMENTS ARE MET BY USERS

(75) Inventors: Patrick S. Botz, Rochester, MN (US); Michael John Branson, Rochester, MN (US); Gregory Richard Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 11/970,642

(22) Filed: Jan. 8, 2008

(65) Prior Publication Data
US 2009/0178130 A1    Jul. 9, 2009

(51) Int. Cl.
H04L 29/06    (2006.01)
(52) U.S. Cl. .............................................. 726/10; 726/6
(58) Field of Classification Search .......... 713/155–157, 713/175; 726/5, 6, 10
See application file for complete search history.

(56) References Cited

U.S. PATENT DOCUMENTS

| | | | |
|---|---|---|---|
| 6,263,434 B1* | 7/2001 | Hanna et al. | 713/156 |
| 2002/0029279 A1* | 3/2002 | Campbell et al. | 709/229 |
| 2002/0166049 A1* | 11/2002 | Sinn | 713/175 |
| 2003/0056093 A1* | 3/2003 | Huitema et al. | 713/156 |
| 2003/0135731 A1* | 7/2003 | Barkan et al. | 713/155 |

* cited by examiner

*Primary Examiner* — Edward Zee
(74) *Attorney, Agent, or Firm* — Owen J. Gamon

(57) ABSTRACT

In an embodiment, a verifier receives requirements for membership in a group from a service and receives proof of attributes from users. The verifier verifies whether the proof of attributes meets the membership requirements and sends acceptance or rejection to the service. If the proof meets the requirements, the service allows the users to become members of the group and allows the members to transfer data to and from other members. If the proof does not meet the requirements, the service prevents the users from becoming members. In this way, the service and group members know that other group members satisfy the group membership requirements without needing to know the identity of the group members or other information unrelated to the group membership requirements.

18 Claims, 10 Drawing Sheets

AMALGAMATED GROUP MEMBERSHIP REQUIREMENTS 152

| SERVICE ID (418) | GROUP ID (420) | ATTRIBUTE (422) | | | |
|---|---|---|---|---|---|
| | | ATTRIBUTE ID | LOGICAL OPERATOR | REFERENCE VALUE | |
| SERVICE A | GROUP A | AGE | > <br> < | 5 <br> 18 | 402 |
| SERVICE A | GROUP A | STATE OF RESIDENCE | = | MN | 404 |
| SERVICE A | GROUP B | DEGREE | = | MD | 406 |
| SERVICE A | GROUP B | LICENSE | = | PHYS MN | 408 |
| SERVICE A | GROUP B | BOARD CERTIFIED | = | PEDIAT | 410 |
| SERVICE B | GROUP C | STUDENT STATUS | = | UNIV OF MINN | 412 |
| SERVICE B | GROUP C | ZIP CODE OF RESIDENCE | = | 55901 | 414 |
| SERVICE B | GROUP C | MARITAL STATUS | = | MARRIED | 416 |

FIG. 4

GROUP COMMUNICATION DATA 153

| GROUP ID (508) | COMMUNICATE WITH GROUP (510) | |
|---|---|---|
| GROUP A | GROUP B | 502 |
| GROUP B | GROUP A, GROUP B | 504 |
| GROUP C | GROUP C | 506 |

FIG. 5

| | | PERSON DATABASE | | | | 158 |
|---|---|---|---|---|---|---|
| 850 | 852 | 854 | 856 | 858 | 860 | |
| PUBLIC KEY OF PERSON | CLEAR TEXT GUID OF PERSON | ATTRIBUTE ID | LOGICAL OPERATOR | REF VALUE | MET FLAG | |
| KEY I | GUID A | AGE | > < | 5 18 | T | 802 |
| KEY I | GUID A | STATE OF RESIDENCE | = | MN | T | 804 |
| KEY J | GUID B | DEGREE | = | MD | T | 806 |
| KEY J | GUID B | LICENSE | = | PHYS MN | T | 808 |
| KEY J | GUID B | BOARD CERTIFIED | = | PEDIAT | T | 810 |
| KEY K | GUID C | DEGREE | = | MD | T | 812 |
| KEY K | GUID C | LICENSE | = | MD | T | 814 |
| KEY K | GUID C | BOARD CERTIFIED | = | PEDIAT | T | 816 |
| KEY L | GUID D | STUDENT STATUS | = | UNIV OF MN | T | 818 |
| KEY L | GUID D | ZIP CODE | = | 55901 | T | 820 |
| KEY L | GUID D | MARITAL STATUS | = | M | T | 822 |
| KEY M | GUID E | STUDENT STATUS | = | UNIV OF MN | T | 824 |
| KEY M | GUID E | ZIP CODE | = | 55901 | T | 826 |
| KEY M | GUID E | MARITAL SATUS | = | M | T | 828 |
| KEY N | GUID F | STUDENT STATUS | = | UNIV OF MN | T | 830 |
| KEY N | GUID F | ZIP CODE | = | 55901 | F | 832 |
| KEY N | GUID F | MARITAL SATUS | = | M | F | 834 |

FIG. 8

VERIFYING THAT GROUP MEMBERSHIP REQUIREMENTS ARE MET BY USERS

FIELD

An embodiment of the invention generally relates to verifying that attributes of users meet the membership requirements for joining a group.

BACKGROUND

Computer systems typically include a combination of hardware, such as semiconductors and circuit boards, and software, also known as computer programs. Computers are often connected together via network, which allows users at different computers, which are sometimes located nearby but are often separated by great distances, to exchange information. One example of a network is the Internet, and users commonly use the Internet to exchange information via such techniques as forums, email, chat sessions, instant messaging, virtual reality communities, and transactions (e.g., e-commerce, auctions, and the purchase and sale of goods and services).

Much of this information exchange is between users who are anonymous, meaning that users often do not know each other's real identity, such as their legal name and address of residence. Users also usually do not know descriptive information that would normally be apparent in a physical encounter, such as each other's approximate age and gender. Instead, users are often known only by assumed names, handles, screen names, or email addresses, multiple different versions of which can easily be generated, changed, and discarded at the user's sole discretion. This anonymity of users can facilitate undesirable activities, such as harassment and fraud. Vulnerable users, such as children, are particularly at risk, but even sophisticated and cautious adults can fall victim.

A current technique for attempting to lower the risk of interacting with anonymous users is the use of digital certificates. A digital certificate (also called an identity certificate or a public key certificate) is an electronic document that uses a digital signature to bind together a public key with an identity, such as a person's name, organization, and address. The digital signature is typically generated by a trusted third party, which is often called the certificate authority. The digital certificate can be used by the receiving user (via the techniques of public-key cryptography) to verify that the public key belongs to the identity, and thus that the information (a document, email, or other received information), to which the digital certificate is attached, originated from the identity.

To understand the deficiencies of digital certificates, consider the following example, in which a user receives an email that contains a digital certificate. The digital certificate includes an identity of "Jane Doe" and a digital signature generated by a certificate authority, which is trusted by the receiving user. The text of the email alleges that Jane Doe is a 55-year-old female physician who is offering herbal supplements for sale that promote health. The existence of the digital certificate does not imply that Jane Doe is 55 years old, that Jane Doe is female, that Jane Doe is a physician, that the herbal supplements promote health, or that anyone named "Jane Doe" even exists. Instead, at best, the existence of the digital certificate implies that if the user receives multiple emails from the identity "Jane Doe," then all those emails originated from the same originator, and the email has not been tampered with in route. Thus, digital certificates do not allow the receiving user to trust that the associated information is true because digital certificates do not verify or describe the originator's age, gender, educational background, professional licenses, or any other attributes, characteristics, qualifications, or achievements of the originator.

Thus a better technique is needed that allows users to trust the information provided by others.

SUMMARY

A method, apparatus, system, and storage medium are provided. In an embodiment, a verifier receives requirements for membership in a group from a service and receives proof of attributes from users. The verifier verifies whether the proof of attributes meets the membership requirements and sends acceptance or rejection to the service. If the proof meets the requirements, the service allows the users to become members of the group and allows the members to transfer data to and from other members. If the proof does not meet the requirements, the service prevents the users from becoming members. In this way, the service and group members know that other group members satisfy the group membership requirements without needing to know the identity of the group members or other information unrelated to the group membership requirements.

BRIEF DESCRIPTION OF THE DRAWINGS

Various embodiments of the present invention are hereinafter described in conjunction with the appended drawings:

FIG. 4 depicts a block diagram of an example data structure for group membership requirements, according to an embodiment of the invention.

FIG. 5 depicts a block diagram of an example data structure for group communication data, according to an embodiment of the invention.

FIG. 8 depicts a block diagram of an example data structure for a person database, according to an embodiment of the invention.

DETAILED DESCRIPTION

In an embodiment, a verifier receives requirements for membership in a group from a service that manages the group. The membership requirements specify the attributes that users must satisfy, in order to join the group. The membership requirements are identical for all group members, i.e., they do not uniquely identify the individual members. The verifier saves the membership requirements, investigates the service, creates a service digital certificate, and sends the service digital certificate to the service. The user submits proof of the user's attribute values to the verifier. In various embodiments, the proof may take the form of documentary evidence and/or the user may be required to appear in person. The verifier determines whether the proof is valid, and if so, the verifier creates a person digital certificate and sends the person digital certificate to the user.

The user then sends a command to the service, requesting to join a group. The service sends the person digital certificate and the service digital certificate to the verifier. If the person digital certificate and the service digital certificate are valid, the verifier determines whether the user's previously submitted proof of attribute values meet the membership requirements of the group that the user desires to join. If the proof meets the group membership requirements, the service allows the user to become a member of the group and transfers data to and from the user, the group, and other group members. If the proof does not meet the membership requirements, the service prevents the user from becoming a group member and does not transfer group data to and from the user.

In this way, the service and group members know that other group members satisfy the group membership requirements without needing to know the identity of the group members or other information unrelated to the group membership requirements.

Figure 1:
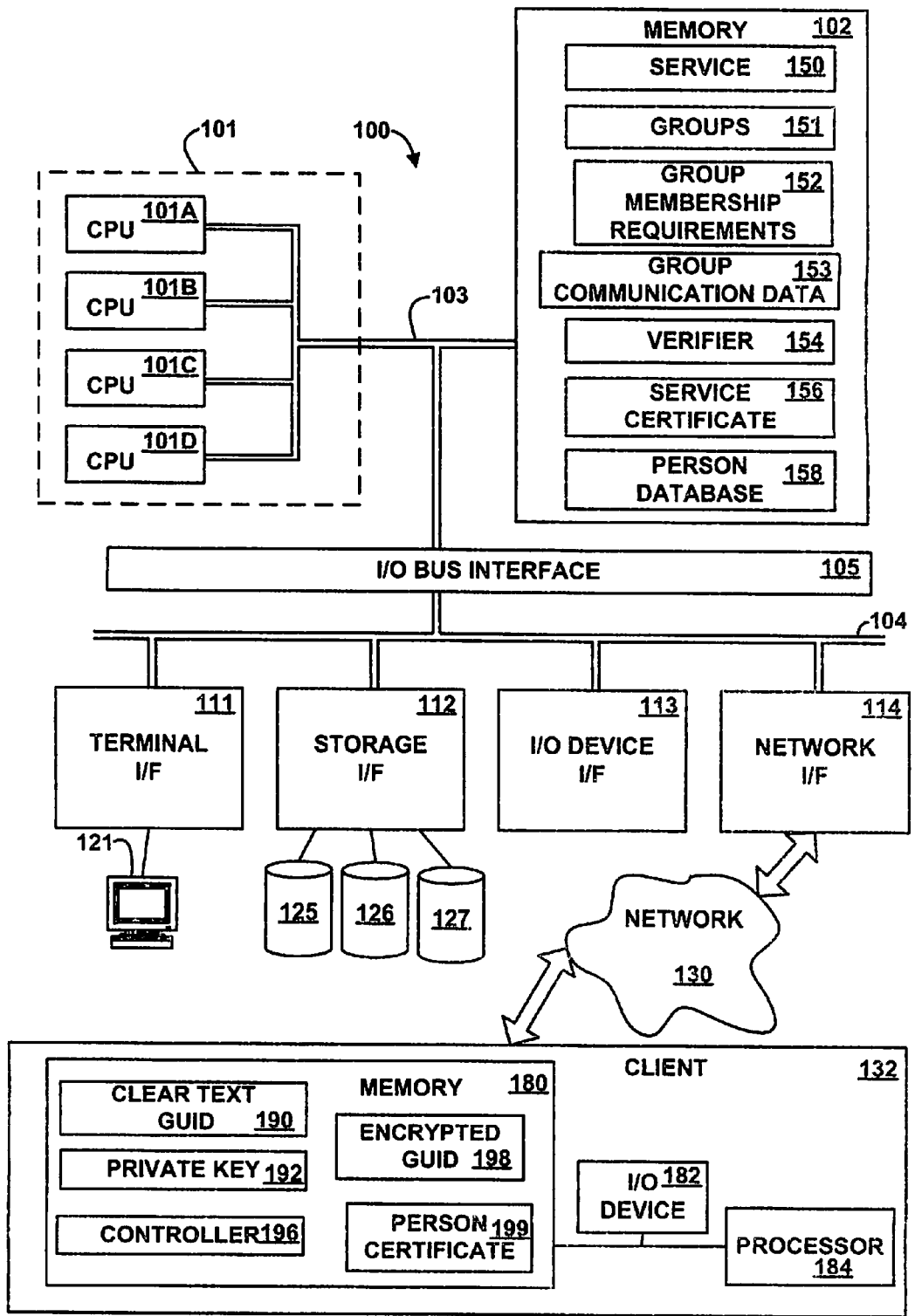
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "client" and "server" are used herein for convenience only, and in various embodiments a computer system that operates as a client in one environment may operate as a server in another environment, and vice versa. In an embodiment, the hardware components of the computer systems 100 and 132 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a service 150, groups 151, group membership requirements 152, group communication data 153, a verifier 154, a digital certificate for a service 156, and a person database 158. Although the service 150, the groups 151, the group membership requirements 152, the group communication data 153, the verifier 154, the digital certificate for a service 156, and the person database 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the service 150, the groups 151, the group membership requirements 152, the group communication data 153, the verifier 154, the digital certificate for a service 156, and the person database 158 are illustrated as being contained within the main memory 102, these elements are not necessarily all completely contained in the same storage device at the same time. Further, although the service 150, the groups 151, the group membership requirements 152, the group communication data 153, the verifier 154, the digital certificate for a service 156, and the person database 158 are illustrated as being separate entities, in other embodiments some of them, portions of some of them, or all of them may be packaged together.

The service 150 controls access to, and membership in, the groups 151 by users, who send requests and commands to the service 150 and receive responses and data from the service 150 via the client computer system 132 and the network 130. In various embodiments, the groups 151 may be implemented as email distribution lists, forums, web pages, instant messaging functions, shared documents, chat rooms or sessions, virtual reality communities, simulations, video conferencing systems, games, or any other system for transferring information. In an embodiment, the groups 151 store data, and the service 150 allows users who are members of the group to store data to the group and retrieve the data from the group. In an embodiment, the service 150 further prevents users who are not members of the group from storing data to the group and/or from retrieving data from the group. In an embodiment, users who are members of the group may retrieve both the data that they have stored and the data that other members have stored in the group. In an embodiment, group members send the data to the group where it is stored, and the service 150 forwards the data to some or all group members. In an embodiment, the service 150 provides the network or email addresses of the group members to the group members (but not to non-members), and the members of the group then send the data to other group members without the service 150 acting as an intermediary of the data transfer and/or without the data being stored in the group.

In an embodiment, the service 150 also allows the members of one group to send and/or receive data from another group if allowed by the group communication data 153. The service 150 further prevents the members of one group from sending and/or receiving data from another group if disallowed by the group communication data 153. The group communication data 153 is further described below with reference to FIG. 5.

The group membership requirements 152 specify the physical or mental attributes, characteristics, licenses, or skills that a user must possess or have achieved, in order to become a member of the group. In various embodiments, the group membership requirements 152 may specify the acceptable, minimum, and/or maximum age, date of birth, gender, height, weight, nation, state, county, or zip code of residence or domicile, telephone exchange, citizenship, educational attainment, degree, school, driver's license, professional license, certification, criminal record, marital status, credit score, or any other physical or mental attributes, characteristics, licenses, or skills that describe or are associated with a person. The group membership requirements 152 are further described below with reference to FIG. 4.

In an embodiment, all members of a group 151 possess, have achieved, or are described by the group membership requirements 152; i.e., the group membership requirements 152 are identical for all members of the group. Thus, the group membership requirements 152 are not identity information because the group membership requirements 152 do not uniquely identify the members of their corresponding group 151 (membership in a group does not uniquely identify a member). For example, if the group membership requirements for a particular group specify that the only requirement necessary for membership is that all members must have green eyes, then users who wish to join the group need only prove that they possess the attribute of green eyes. In order to become members of that group, users need not prove or supply information regarding their name, address, age, or any other attribute.

In an embodiment, the verifier 154 determines or verifies whether a user (who desires to join the group) meets the group membership requirements 152 by examining documentary evidence or proof of attributes submitted by the user and comparing the proof to an objective standard. In an embodiment, the verifier 154 may require the physical presence of the user at the location of the verifier and may verify whether a user meets the group membership requirements 152 by comparing the documentation evidence or proof of attributes to the measured attributes or visual appearance of the user. The verifier 154 stores the results of its verification process in the person database 158, which is further described below with reference to FIG. 8. Examples of documentary evidence include a driver's license card, a birth certificate, a school identification card, a passport, a transcript, a diploma, a certificate, or any other verifiable proof of attributes.

The digital certificate for a service 156 is an electronic document that uses a digital signature to bind together a public key with an identity, which identifies the associated service 150. The digital signature is typically generated by the verifier 154, which represents a trusted third party that acts as a certificate authority. The digital certificate 156 can be used by the receiving user (via the techniques of public-key cryptography) to verify that the public key belongs to the associated service 150, and thus that the information to which the digital certificate is attached originated from the service 150. The digital certificate for a service 156 is further described below with reference to FIG. 6.

Cryptography is the practice of hiding information to ensure secrecy in communications and includes encryption and decryption of data. Encryption is the process of converting ordinary information (plain text) into unintelligible information, known as cipher text, which is unreadable or incomprehensible by interceptors or eavesdroppers without secret knowledge (namely, the key needed for decryption). Decryption is the reverse process, converting unintelligible cipher text to plain text using the key. A cipher is a pair of algorithms or processes that perform this encryption and the reverse decryption. The operation of a cipher is controlled both by the algorithm and by a cryptographic key.

Public-key cryptography, also known as asymmetric cryptography, is a form of cryptography in which a user has a pair of cryptographic keys, known as a public key and a private key. Examples of public-key ciphers include the Diffie-Hellman algorithm, the RSA (Rivest, Shamir, and Adleman) algorithm, the Cramer-Shoup cryptosystem, ElGamal encryption, and elliptic curve algorithms, but in other embodiments any appropriate public-key cipher may be used. Public-key cryptography is contrasted with secret key cryptography, also known as symmetric cryptography, which uses a single secret key for both encryption and decryption.

In public-key cryptography, the user, who owns the private key, keeps the private key secret and does not share it with anyone, but the user's public key may be widely distributed to anyone who might send data to or receive data from the user. The public key and the private key are related mathematically and are generated secretly, as an interrelated pair, but the private key cannot be practically derived from the public key. Senders, who wish to send data to the user, encrypt the data with an encryption cipher that accepts the user's public key as input, and then the encrypted data that is output is capable of being decrypted only via a decryption cipher that uses the corresponding private key and the encrypted data as input.

If the user who owns the private key is the sender, the sender attaches a digital signature to a document via an encryption process that creates the digital signature using the sender's private key and the user's identity as input. Anyone who receives this message or document can verify that this message or document was created by the sender and that the message has not been tampered with or altered, via a cipher decryption process that uses the sender's public key and the digital signature as input and then comparing the output of the cipher decryption process to the user's identity.

In an embodiment, any, some, or all of the service 150, the groups 151, and the verifier 154 include instructions capable of executing on the processor 101 or statements capable of being interpreted by instructions that execute on the processor 101, to carry out the functions as further described below with reference to FIGS. 9, 10, 11, and 12. In another embodiment, any, some, or all of the service 150, the groups 151, and the verifier 154 are implemented in hardware via chips, logical gates, circuit cards, and/or other physical hardware devices in lieu of, or in addition to, a processor-based system. In an embodiment, any, some, or all of the service 150, the groups 151, and the verifier 154 may include data.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input to the user terminal 121 and the computer system 100, and may receive output via the user output devices. For example, a user interface may be presented via the user terminal 121, such as displayed on a display device, played via a speaker, or printed via a printer.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). In another embodiment, the devices 125, 126, and/or 127 may be implemented via any type of secondary storage device. The contents of the main memory 102, or any portion thereof, may be stored to and retrieved from the direct access storage devices 125, 126, and 127, as needed.

The I/O device interface 113 provides an interface to any of various other input/output devices or devices of other types, such as printers or fax machines. The network adapter 114 provides one or more communications paths from the computer system 100 to other digital devices and computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3 specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client computer system 132 may include some or all of the hardware components previously described above as being included in the server computer system 100. In particular, the client computer system 132 includes a memory 180 connected to an I/O device 182 and a processor 184. The description of the memory 180 is analogous to the description of the memory 102, the description of the I/O device 182 is analogous to the description of the user terminal 121, and the description of the processor 184 is analogous to the description of the processor 101.

The memory 180 stores or encodes a clear text GUID (Globally Unique Identifier) 190, a private key 192, a controller 196, an encrypted GUID 198, and a digital certificate for a person 199.

The controller 196 generates the clear text GUID 190, which identifies the user who uses the client computer system 132 to send commands to and receive responses from the service 150. In another embodiment, the service 150 generates the clear text GUID 190 and sends the clear text GUID 190 to the client 132. In an embodiment, a GUID is a reference number that is unique in the context of the controller 196 or the service 150 that generates the GUID. In another embodiment, each generated GUID is not necessarily unique, but the total number of unique keys used by the controller 196 or the service 150 to generate the GUID is sufficiently large, so that the probability of the same reference number being generated twice is very small. In an embodiment, the GUID is implemented to conform to the Universally Unique Identifier (UUID) standard, but in other embodiments any appropriate standard or technique may be used for generating a GUID. In an embodiment, the network card MAC (Media Access Control) address of the client computer system 132 that sends a request to the service 150 is used as a base for a portion of the GUID, and the remainder of the GUID is based on a timestamp, time of day, and/or date that represents the time when the GUID was generated. In an embodiment, the clear text GUID 190 is implemented as a nonce, which is a number or bit string used only once. In various embodiments, a nonce is implemented as a random or pseudo-random number and is either time-variant, meaning that the nonce includes a timestamp in its value, or is generated with enough random bits to ensure a probabilistically insignificant chance of repeating a previously generated value.

Clear text is a form of data that is immediately comprehensible to a human being without additional processing. In particular, clear text implies that the data is transferred or stored without cryptographic protection. Clear text data stands in contrast to plain text and cipher text data. Plain text is a form of data that is fed as input into a cryptographic encryption process, or cipher. Cipher text is the form of data that results from a cryptographic encryption process or cipher and is also referred to as encrypted data. Plain text might be compressed, encrypted, or otherwise manipulated before a cryptographic process begins (e.g., by another cryptographic process), so plain text data is not necessarily identical to (and is often non-identical to) clear text data.

The private key 192 is a private cryptographic key. The encrypted GUID 198 is the output cipher text of an cryptographic encryption process or cipher that operates on the clear text GUID 190 as its plain text input.

The digital certificate for a person 199 is an electronic document that uses a digital signature to bind together a public key with an identity, which identifies a person or user who uses the client computer system 132 to send requests or commands to and receive responses from the server computer system 100. The digital signature is generated by the verifier 154, which is a trusted third party that acts as a certificate authority. The digital certificate 199 can be used by the receiver (via the techniques of public-key cryptography) to verify that the public key belongs to the person or user and thus that the information to which the digital certificate 199 is attached originated from that user or person. The service 150 uses the digital certificate for a person 199 to verify the identify of users who interact with the client computer systems 132 to send commands or requests to the service 150. The digital certificate for a person 199 is further described below with reference to FIG. 7.

In an embodiment, the controller 196 includes instructions capable of executing on the processor 184 or statements capable of being interpreted by instructions that execute on the processor 184, to carry out the functions as further described below with reference to FIGS. 10 and 11. In another embodiment, the controller 196 is implemented in hardware via logical gates, circuits, circuit cards, chips, modules, and/or other physical hardware devices in lieu of, or in addition to, a processor-based system.

It should be understood that FIG. 1 is intended to depict the representative major components of the computer system 100, the network 130, and the client computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., and are referred to hereinafter as "computer programs," or simply "programs." The computer programs typically comprise one or more instructions that are resident at various times in various memory and storage devices in the computer systems 100 and/or 132, and that, when read and executed by one or more processors in the computer systems 100 and/or 132, cause the computer systems 100 and/or 132 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
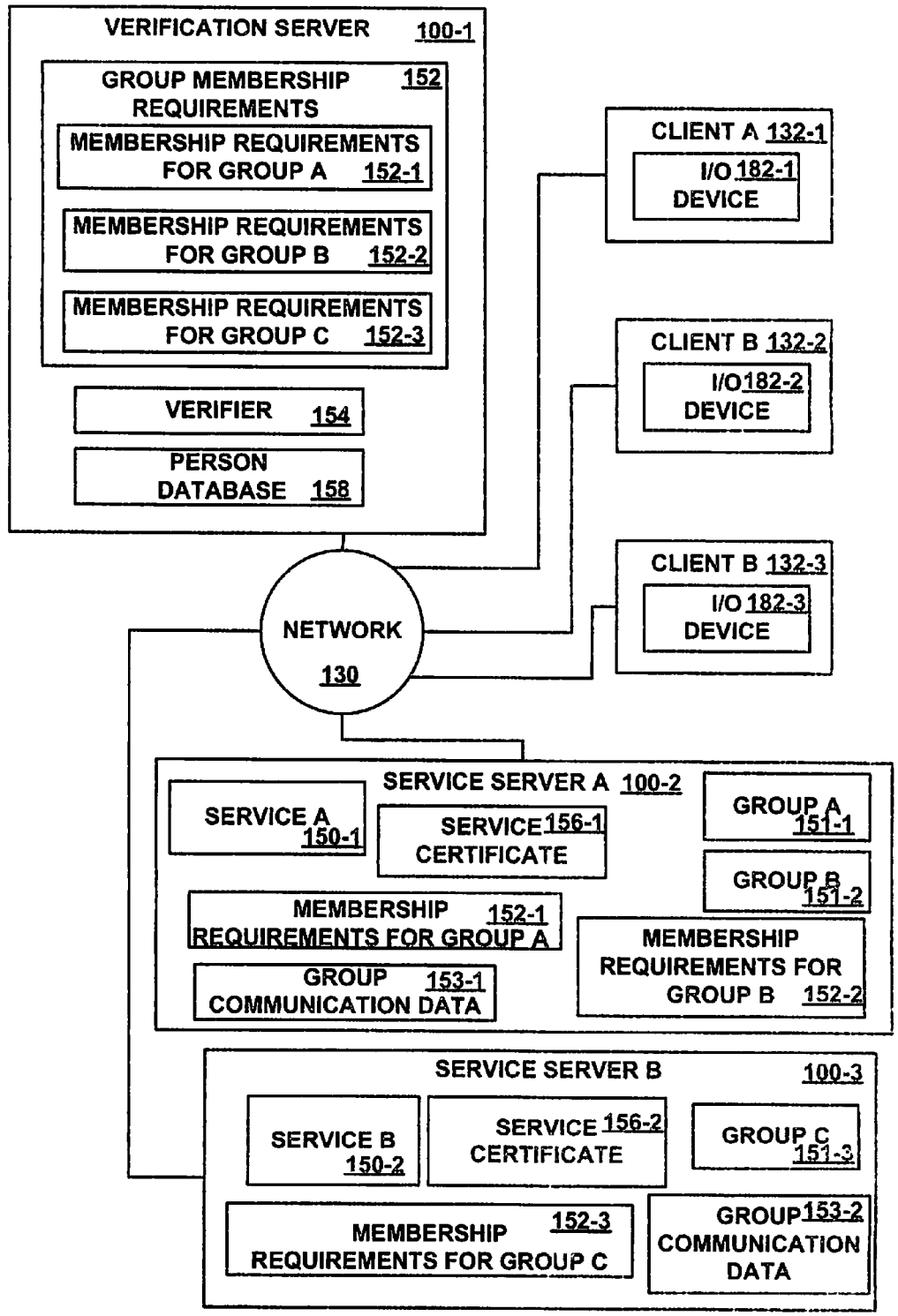
FIG. 2 depicts a block diagram of selected components of the example system, according to an embodiment of the invention.

FIG. 2 depicts a block diagram of selected components of the example system, according to an embodiment of the invention. The verification server computer system 100-1, the service server computer system 100-2, the service server computer system 100-3, the client computer system 132-1, the client computer system 132-2, and the client computer system 132-3 are connected via the network 130. The servers 100-1, 100-2, and 100-3 are examples of the server computer system 100 (FIG. 1). The client computer system 132-1, the client computer system 132-2, and the client computer system 132-3 are examples of the client computer system 132 (FIG. 1).

The verification server computer system 100-1 includes or stores the amalgamated group membership requirements 152, which includes example group membership requirements 152-1, 152-2, and 152-3 for a variety of different groups. The verification server computer system 100-1 received the group membership requirements 152-1, 152-2, and 152-3 from the service servers 100-2 and 100-3. The verification server computer system 100-1 further includes or stores the verifier 154 and the person database 158.

The service server 100-2 includes or stores the group membership requirements 152-1, the group membership requirements 152-2, the group 151-1, the group 151-2, the service 150-1, the digital certificate for a service 156-1, and the group communication data 153-1. The group membership requirements 152-1 represent the requirements that users at the client computer systems 132-1, 132-2, and 132-3 must possess or satisfy, in order to join the group 151-1. The group membership requirements 152-2 represent the requirements that the users at the client computer systems 132-1, 132-2, 132-3 must possess or satisfy, in order to join the group 151-2.

The service server 100-3 includes or stores the group membership requirements 152-3, the group 151-3, the service 150-2, the digital certificate for a service 156-2, and the group communication data 153-2. The group membership requirements 152-3 represent the requirements that users at the client computer systems 132-1, 132-2, and 132-3 must possess or satisfy, in order to join or access the group 151-3.

The service 150-1 and the service 150-2 are examples of the service 150 (FIG. 1). The group communication data 153-1 and the group communication data 153-2 are examples of the group communication data 153 (FIG. 1). The digital certificate for a service 156-1 and the digital certificate for a service 156-2 are examples of the digital certificate for a service 156 (FIG. 1).

The client computer system 132-1 includes an I/O device 182-1, the client computer system 132-2 includes an I/O device 182-2, and the client computer system 132-3 includes an I/O device 182-3. The I/O device 182-1, the I/O device 182-2, and the I/O device 182-3 are examples of the I/O device 182 (FIG. 1).

Thus, in an embodiment, the verifier 154 (that verifies that users meet the group membership requirements 152) is stored at and executes at a different server computer system 100-1 than the servers 100-2 and 100-3 at which the groups 151-1, 151-2, and 151-3 are stored and at which the services 150-1 and 150-2 execute to manage and control access to their respective groups 151-1, 151-2, and 151-3.

Figure 3A:
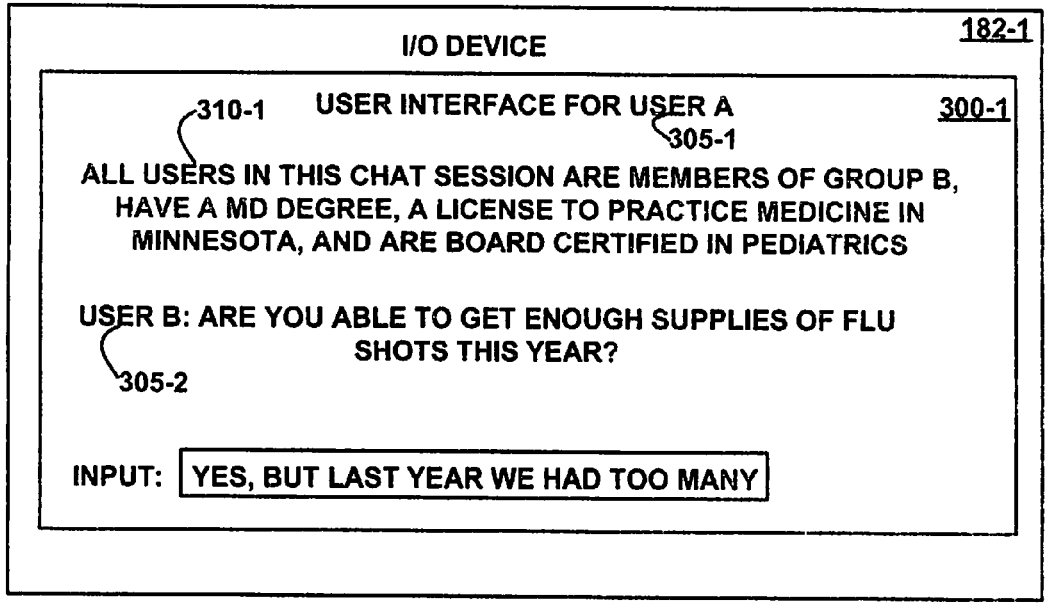
FIG. 3A depicts a block diagram of an example user interface displayed via a display device, according to an embodiment of the invention.
Figure 3B:
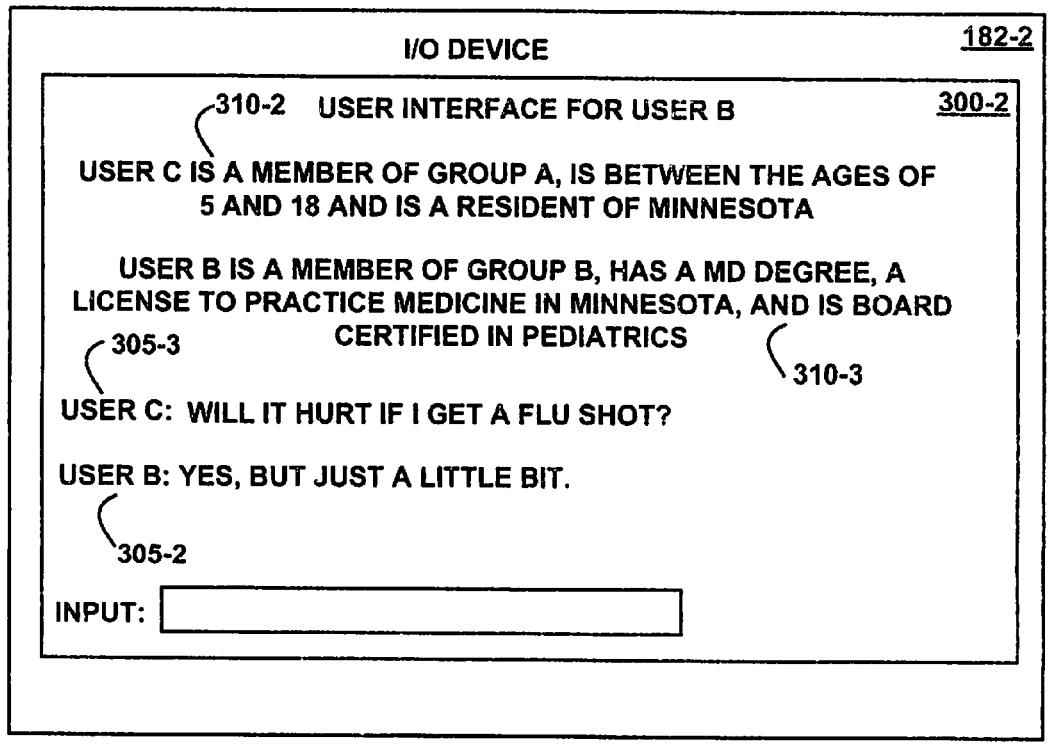
FIG. 3B depicts a block diagram of an example user interface displayed via a display device, according to an embodiment of the invention.

FIGS. 3A and 3B represent example user interfaces, via which members of groups may communicate or transfer information. The user interfaces of FIGS. 3A and 3B represent example chat sessions or instant messaging sessions, but in other embodiments, user interfaces may be presented for groups that facilitate communication among members via email distribution lists, forums, web pages, shared documents, virtual reality communities, simulations, video conferencing systems, games, or any other system for transferring information.

FIG. 3A depicts a block diagram of an example user interface 300-1 displayed or presented via the I/O device 182-1, according to an embodiment of the invention. The user interface 300-1 includes identifications of users 305-1 and 305-2 and a message 310-1. As illustrated in the example user interface 300-1, the user 305-1 is using the user interface 300-1 via the I/O device 182-1 at the client computer system 132-1 to receive data from, and/or transfer data to, the group 151-2 (FIG. 2) or another user 305-2 at another client, such as the client computer system 132-2. The user interface 300-1 includes a displayed message 310-1, which presents the membership requirements 152-2 (FIG. 2) of the group 151-2 (FIG. 2), which the attributes of the user 305-1 meet and the attributes of the user 305-2 meet. Thus, in the example of FIG. 3A, all users accessing the group 151-2 (FIG. 2) or transferring data to/from members of the group 151-2 (FIG. 2) belong to or meet the membership requirements of the same group 151-2 (FIG. 2).

FIG. 3B depicts a block diagram of an example user interface 300-2 displayed or presented via the I/O device 182-2, according to an embodiment of the invention. The user interface 300-2 includes identifications of users 305-2 and 305-3, a message 310-2, and a message 310-3. As illustrated in the example user interface 300-2, the user 305-2 is using the user interface 300-2 via the I/O device 182-2 at the client computer system 132-2 to receive data from, and/or transfer data to, the group 151-1 (FIG. 2) or another user 305-3 at another client, such as the client computer system 132-3. The user interface 300-2 includes a displayed message 310-2, which presents the membership requirements 152-1 (FIG. 2) of the group 151-1 (FIG. 2), which the attributes of the user 305-3 meet, but the attributes of the user 305-2 do not meet. Thus, in the example of FIG. 3B, users that belong to different groups may transfer data to/from each other if allowed by the group communication data 153.

FIG. 4 depicts a block diagram of an example data structure for group membership requirements 152, according to an embodiment of the invention. The group membership requirements 152 include records 402, 404, 406, 408, 410, 412, 414, and 416, each of which includes a service identifier field 418, a group identifier field 420, and an attribute field 422. The service identifier field 418 identifies or specifies a service 150 (such as the service 150-1 at the service server computer system 100-2 or the service 150-2 at the service server computer system 100-3), which manages or controls access to the group identified by the group identifier field 420 in the same record. The group identifier field 420 identifies or specifies a group, such as the group 151-1, 151-2, or 151-3, which is managed or controlled by the service identified by the service identifier field 418 in the same record.

The attribute field 422 identifies or specifies a physical or mental attribute, characteristic, license, or skill that a user must possess or have achieved, in order to become a member, belong to, or access the group identified by the group identifier field 420 in the same record. The attribute field 422 includes an attribute identifier that identifies the attribute, a logical operator or operators, and a reference value. Thus, the attribute value that a user possesses must satisfy the logical statement formed by the attribute identifier, the logical operator, and the reference value, i.e., the logical statement represented by the attribute, the logical operator, and the reference value must evaluate to true, in order for the user to satisfy the group membership requirement specified by the attribute for the group in the same record. For example, as specified in record 402, in order for the service 418 to allow a user to become a member of "group A," the user must have an age that is both greater than "5" and less than "18," i.e., the value of the user's age attribute when substituted for "age" in the statement "age >5 and age <18" must cause the statement to evaluate to true.

In an embodiment, all members of the group possess, have achieved, or are described by the attributes specified by the attribute field 422; i.e., the group membership requirements are identical for all members. Thus, the attributes 422 are not identity information because the attributes 422 do not uniquely identify the members of the group in the same record (membership in a group does not uniquely identify a member). In various embodiments, the attributes 422 specify the acceptable, minimum, and/or maximum age, date of birth, gender, height, weight, nation, state, county, or zip code of residence or domicile, telephone exchange, citizenship, educational attainment, degree, school, driver's license, professional license, certification, criminal record, marital status, credit score, or any other physical or mental attributes, characteristics, licenses, or skills that describe or are associated with a person or user.

FIG. 5 depicts a block diagram of an example data structure for example group communication data 153, according to an embodiment of the invention. The example group communication data 153 includes example records 502, 504, and 506, each of which includes a group identifier field 508 and a group communication field 510. The group identifier field 508 identifies or specifies a group, such as the group 151-1, 151-2, or 151-3. The group communication field 510 identifies or specifies an associated group or groups with which members of the group identified by the group identifier 508 in the same record is allowed to communicate. That is, the service 150 that manages the group specified by the group identifier field 508 allows a user who is a member of the group specified by the group identifier field 508 to communicate with or transfer data/to from users who are members of the group 510, in the same record. The service that manages the group 508 further prevents a user who is a member of the group 508 from communicating with or transferring data to/from users who are members of groups not specified by the group 510, in the same record.

As specified by the example record 502, the service allows users who are members of "group A" to transfer data to/from users who are members of "group B" and prevents the users who are members of "group A" from transferring data to/from users who are members of other groups. As specified by the example record 504, the service allows users who are members of "group B" to transfer data to/from users who are members of "group A" and "group B" and prevents the users who are members of "group B" from transferring data to/from users who are members of other groups. As specified by the example record 506, the service allows users who are members of "group C" to transfer data to/from users who are members of "group C" and prevents the users who are members of "group C" from transferring data to/from users who are members of other groups.

Figure 6:
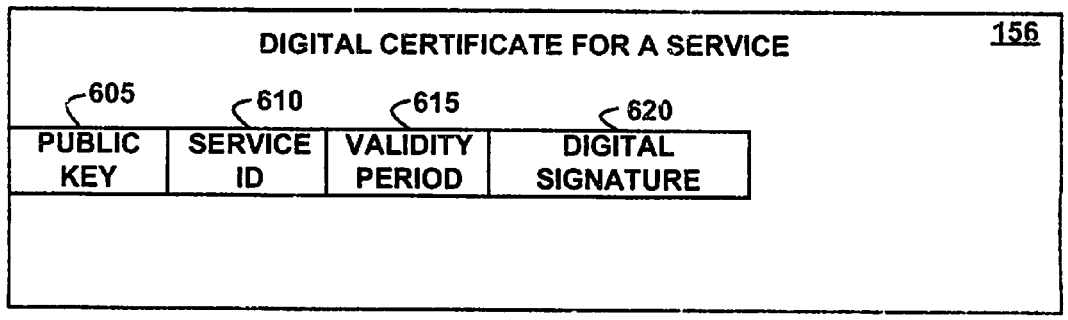
FIG. 6 depicts a block diagram of an example data structure for a digital certificate for a service, according to an embodiment of the invention.

FIG. 6 depicts a block diagram of an example data structure for an example digital certificate for a service 156, according to an embodiment of the invention. The example digital certificate for a service 156 includes or stores a public key 605, a service identifier 610, a validity period 615, and a digital signature 620.

The digital certificate for a service 156 is an electronic document that uses a digital signature 620 to bind together the public key 605 with the service identifier (an identity) 610, which identifies the service 150. The digital certificate for a service 156 is valid during the time period specified by the validity period 615. The digital signature 620 is typically generated by the verifier 154, which represents a trusted third party that acts as a certificate authority (CA). The verifier 154 generates the digital signature 620 with an encryption cipher that uses a private key that belongs to the verifier 154 (the certificate authority), the public key 605, and the service identifier 610 as input and creates the encrypted digital signature 620 as output. Thus, the digital signature 620 represents an attestation by the digital certificate signer or certificate authority, e.g., the verifier 154, that the identity information (the service identifier 610) and the public key 605 belong together. The digital certificate 156 can be used by the receiving user (via the techniques of public-key cryptography) to verify that the public key 605 belongs to the service 610, and thus that associated information, to which the digital certificate 156 is attached, originated from the service 610, by decrypting the digital signature 620 with a decryption cipher that uses the digital signature 620 and the public key of the verifier 154 as input. The public key 605 is public, meaning that it is not secret or private, and the service may distribute or publish the public key 605. In an embodiment, the digital certificate for a service 156 conforms to the ITU-T (International Telecommunication Union) X.509 standard, but in other embodiments any appropriate type of digital certificate, standard, or protocol may be used.

Figure 7:
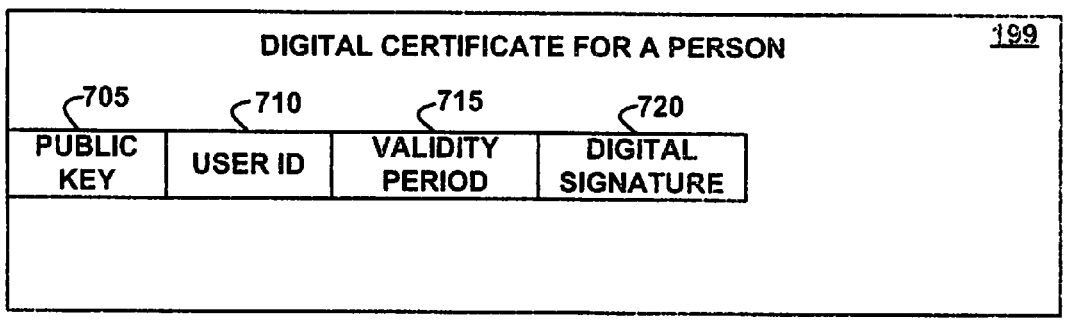
FIG. 7 depicts a block diagram of an example data structure for a digital certificate for a person, according to an embodiment of the invention.

FIG. 7 depicts a block diagram of an example data structure for an example digital certificate for a person 199, according to an embodiment of the invention. The example digital certificate for a person 199 includes or stores a public key 705, a user identifier 710, a validity period 715, and a digital signature 720.

The digital certificate for a person 199 is an electronic document that uses a digital signature 720 to bind together the public key 705 with the user identifier (an identity) 710, which identifies the user represented by the digital certificate 199. The digital certificate for a person 199 is valid during the time period specified by the validity period 715. The digital signature 720 is typically generated by the verifier 154, which represents a trusted third party that acts as a certificate authority (CA). The verifier 154 generates the digital signature 720 using an encryption cipher that accepts a private key that belongs to the verifier 154 (the certificate authority), the public key 705, and the user identifier 710 as input. Thus, the digital signature 720 represents an attestation by the digital certificate signer or certificate authority, e.g., the verifier 154, that the identity information (the user identifier 710) and the public key 705 belong together. The digital certificate 156 can be used by the receiver of the digital certificate (via the techniques of public-key cryptography) to verify that the public key 705 belongs to the user 710, and thus that associated information, to which the digital certificate 156 is attached, originated from the user 710, by decrypting the digital signature 720 with a decryption cipher that uses the digital signature 720 and the public key of the verifier 154 as input. The public key 705 is public, meaning that it is not secret or private, and the user may distribute or publish the public key 705. In an embodiment, the digital certificate for a person 199 conforms to the ITU-T (International Telecommunication Union) X.509 standard, but in other embodiments any appropriate type of digital certificate, standard, or protocol may be used.

FIG. 8 depicts a block diagram of an example data structure for an example person database 158, according to an embodiment of the invention. The example person database 158 includes records 802, 804, 806, 808, 810, 812, 814, 816, 818, 820, 822, 824, 826, 828, 830, 832, and 834, each of which includes a public key of a person 850, a clear text GUID of a person 852, an attribute identifier field 854, a logical operator field 856, a value field 858, and a met flag 860. The values of the public key of a person 850, the clear text GUID of a person 852, the attribute identifier field 854, the logical operator field 856, the reference value field 858, and the met flag 860 are associated with, and correspond to, each other in the same record.

The public key of a person 850 identifies or specifies the public key that belongs to or is associated with a person or user, such as the public key 705. The clear text GUID of a person 852 identifies or specifies the clear text GUID 190 that is associated with the user who owns the associated public key 850, in the same record.

The attribute identifier field 854, the logical operator field 856, and the reference value field 858 identify an attribute 422 that exists in a record in the group membership requirements 152. The met flag 860 indicates whether or not the user (identified by the clear text GUID 852 and the public key 850, in the same record) has submitted validated proof of a value that meets the group membership requirement represented by the record. That is, the met flag 860 indicates whether or not the statement formed by the attribute identifier 854, the logical operator 856, and the reference value 858 evaluates to true when the value of the user's validated proven attribute is substituted for the attribute 854 in the statement.

For example, the record 802 specifies an attribute identifier 854 of "age," a logical operator 856 of "<" and ">," and reference values of "5" and "18." Thus, the statement "age >5 and age <18" is formed from the record 802, and the met flag 860 in the record 802 is "T," so the statement "age >5 and age <18" evaluates to "T" or true when the validated proven value of the age of the user (identified by the clear text GUID 852 and the public key 850) is substituted into the statement. Thus, the user's validated and proven age is greater than 5 and less than 18.

As another example, the record 834 specifies an attribute identifier 854 of "marital status," a logical operator 856 of "=," and reference value of "M." Thus, the statement "marital status=M" is formed from the record 834, and the met flag 860 in the record 834 is "F," so the statement "marital status=M" evaluates to "F" or false when the value of the marital status of the user (identified by the clear text GUID 852 and the public key 850) is substituted into the statement. Thus, the user (who has a clear text GUID of "GUID F" and a public key of "key N") does not have a proven marital status of married, meaning that the user did not submit proof of a marital status attribute value, the user submitted proof of a marital status attribute value that the verifier 154 deemed invalid, or the user submitted proof of a marital status attribute value that did not equal married.

Figure 9:
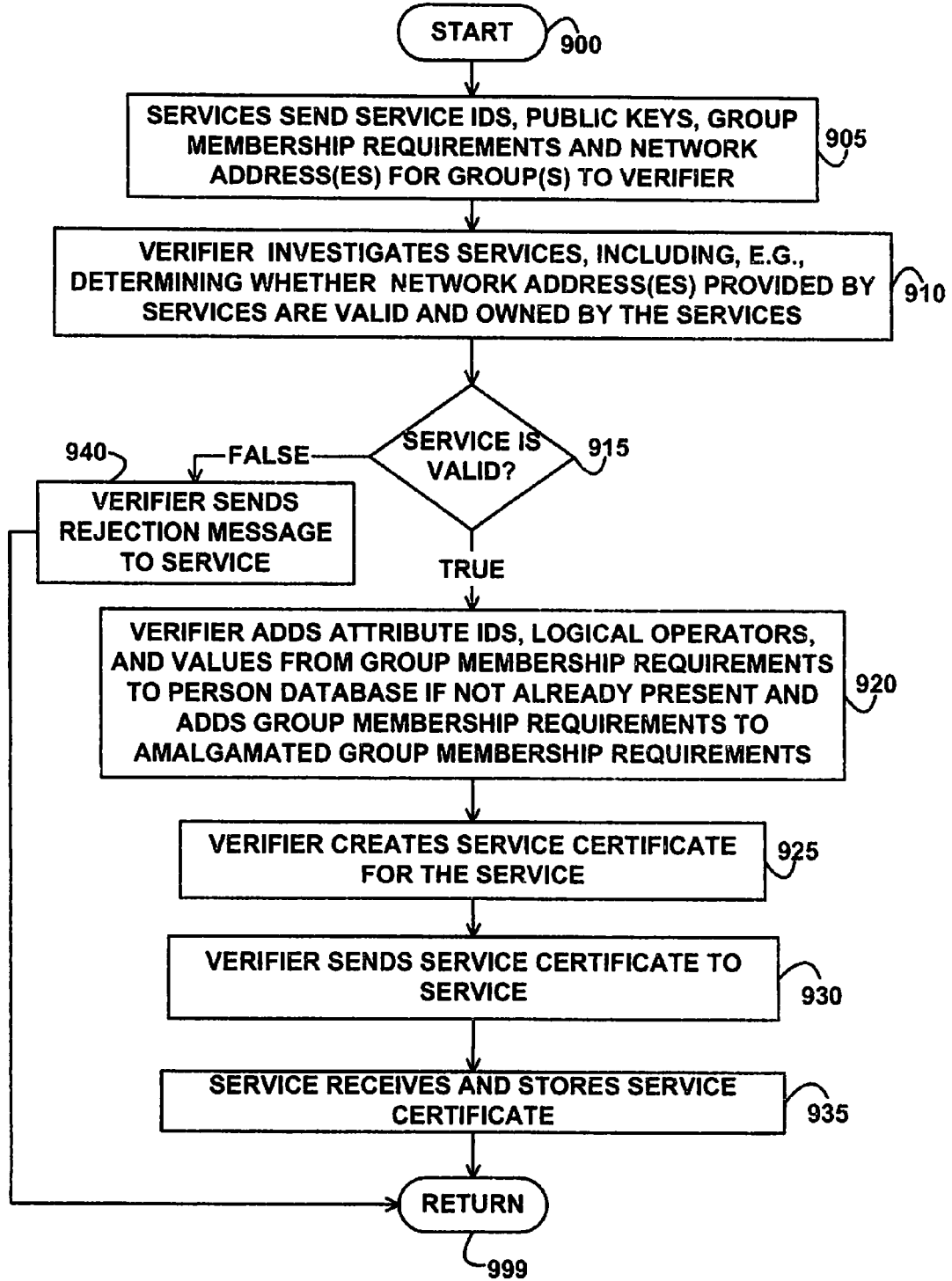
FIG. 9 depicts a flowchart of example processing for handling group membership requirements, according to an embodiment of the invention.

FIG. 9 depicts a flowchart of example processing for handling group membership requirements, according to an embodiment of the invention. Control begins at block 900. Control then continues to block 905 where the services 150 (e.g., the services 150-1 and 150-2) send the respective public keys owned by the respective services, respective service identifiers that identify the services, the group membership requirements 152-1, 152-2, and 152-3, and the network addresses or locations for the groups 151-1, 151-2, and 151-3 that the services manage or control to the verifier 154, which the verifier receives. In an embodiment, the verifier 154 may receive information from the various services 150 at various times.

Control then continues to block 910 where the verifier 154 investigates the services 150. In an embodiment, the verifier 154 investigates the services 150 by determining whether the network addresses provided by the services 150 are valid and owned by the providing services 150. In an embodiment, the verifier 154 determines whether the network addresses provided by the services 150 are valid and owned by the services 150 by sending requests to the network addresses for pages and receiving the pages. If pages are not received from the network addresses, then the verifier 154 determines that the network addresses are not valid. If pages are received from the network addresses, then the verifier 154 determines that the network addresses are valid. In another embodiment, the verifier 154 compares information received from the services to the received pages, and if the information received from the services matches the content of the pages, the verifier determines that the network addresses are valid, but if the information received from the services does not match the content of the pages, the verifier determines that the network addresses are not valid.

In an embodiment, the verifier 154 sends requests to registrars of the domains that host the network addresses or to a search service and by verifying that information (the identity of the owner of the domain) provided by the registrars or the search service in response to the requests matches the service identifier received from the service. If the service identifier received from the services matches the identity of the owner received from the registrar or the search service, then the verifier determines that the network addresses are valid and owned by the service, but if the service identifier received from the services does not match the identity of the owner received from the registrar or the search service, then the verifier determines that the network addresses are not valid and/or are not owned by the service.

Control then continues to block 915 where the verifier 154 determines whether the investigation found that that the network addresses provided by the services 150 are valid and owned by the respective services 150. If the determination at block 915 is true, then the investigation found that the services 150 are valid, so control continues to block 920 where the verifier 154 adds the received attributes 422 (the attribute identifiers, the associated logical operators, and the associated reference values) from the received group membership requirements 152-1, 152-2, and 152-3 to records in the person database 158 if the attributes are not already present in the person database 158. The verifier 154 further adds the received group membership requirements 152-1, 152-2, and 152-3 to the amalgamated group membership requirements 152 or updates the amalgamated group membership requirements 152.

Control then continues to block 925 where the verifier 154 creates the digital certificate for the service 156. The verifier 154 stores the public key and service identifier that were received from the respective service into the public key field 605 and the service identifier field 610, respectively. The verifier 154 creates the digital signature 620 using a cryptographic encryption cipher or process that uses, as input, the public key 605, the service identifier 610, and a private key that is owned by the verifier. The encrypted digital signature 620 is the output of the cryptographic encryption cipher or process. Thus, the verifier 154 creates the digital signature 620 to bind together the public key 605 of the service and the service identifier 610.

Control then continues to block 930 where the verifier 154 sends the digital certificate for the service 156 to the service 150. Control then continues to block 935 where the service 150 receives the digital certificate for the service 156 and stores the digital certificate for the service 156 at the server, such as the server computer system 100, the service server computer system 100-2, or the service server computer system 100-3. Control then continues to block 999 where the logic of FIG. 9 returns.

If the determination at block 915 is false, then the investigation found that the service 150 is not valid, so control continues to block 940 where the verifier 154 sends a rejection message to the service 150 without creating or sending a digital certificate for the service 156. The service 150 optionally presents, displays, or plays the rejection message via the user terminal 121. Control then continues to block 999 where the logic of FIG. 9 returns.

Figure 10:
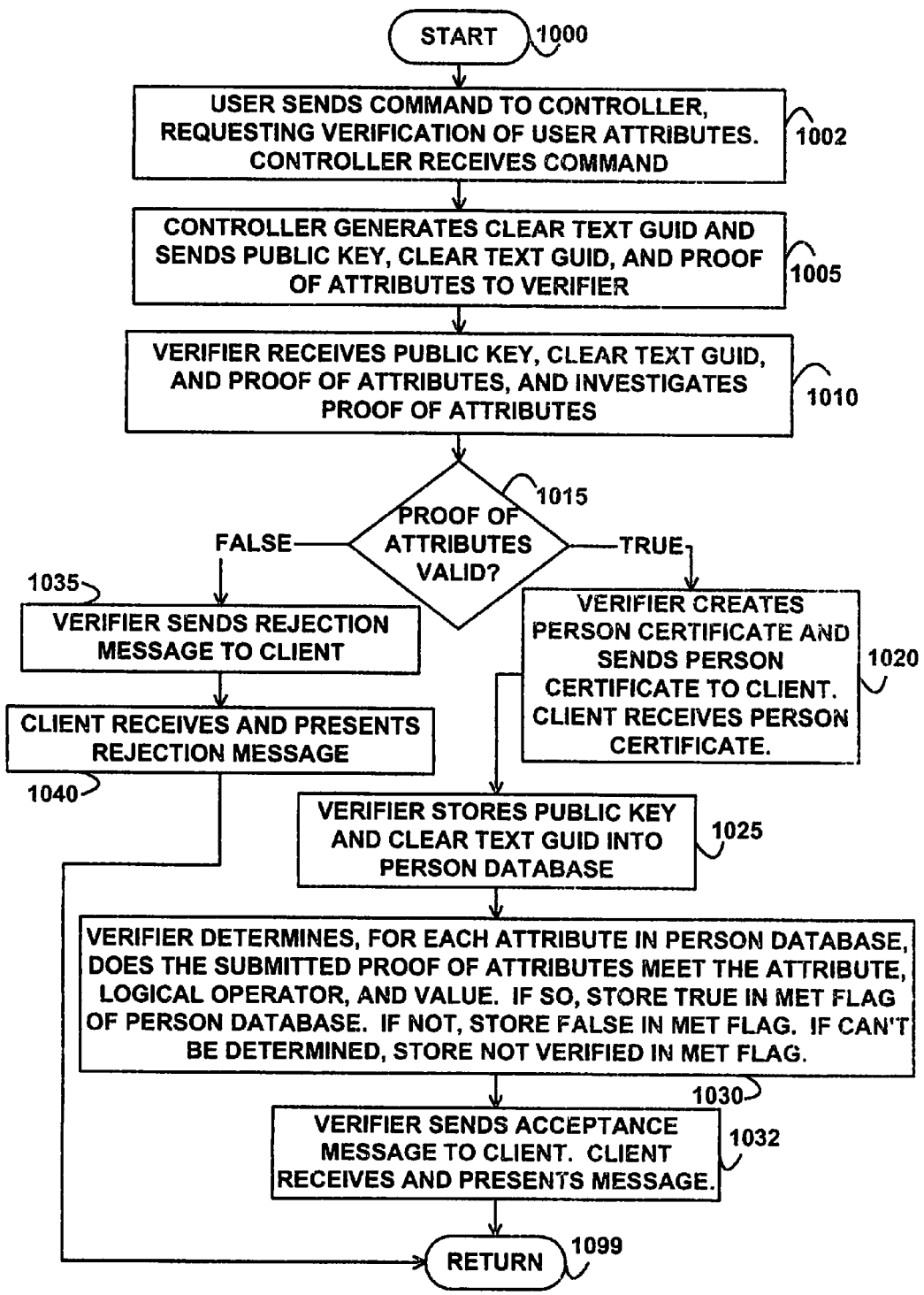
FIG. 10 depicts a flowchart of example processing for verifying attributes, according to an embodiment of the invention.

FIG. 10 depicts a flowchart of example processing for verifying attributes, according to an embodiment of the invention. Control begins at block 1000. Control then continues to block 1002 where a user at the client computer system 132 sends a command to the controller 196 via a user interface and operating the I/O device 182. The command requests verification of proof of the values of the attributes that are associated with or describe the user. In an embodiment, some or all of the attributes are specified by attribute identifiers in the attributes 422 in the amalgamated group membership requirements 152. In an embodiment, the user submits proof of the values of the attributes to the controller 196 with the command. In various embodiments, the proof of the values of the user's attributes may take the form of a driver's license, identification card, social security card, birth certificate, marriage license, divorce decree, diploma, certificate, test results, criminal records, medical records, court order, deed, title, utility bill, any other documentary evidence, or any portion, multiple, or combination thereof. In an embodiment, the user submits the public key that is owned by a user with the command. In another embodiment, the controller generates the public key that is owned by the user.

In response to receiving the command, control then continues to block 1005 where the controller 196 of the client computer system 132 generates the clear text GUID 190 that identifies the user. The controller 196 then sends the public key that is owned by a user, the clear text GUID 190 that identifies the user, and proof of the user's attributes or a copy of the proof of the user's attributes to the verifier 154. In another embodiment, the user appears in person at an office associated with the verifier 154 and personally submits the proof of the values of the user's attributes to the verifier 154.

Control then continues to block 1010 where the verifier 154 receives the public key of the user, the clear text GUID, and the proof of attributes. In response to the receiving, the verifier 154 investigates the proof of the attributes. In an embodiment, the verifier 154 investigates the proof of the attributes by sending the proof of attributes to the purported source or issuer and receiving a response from the source or issuer that either states the proof of attributes are valid or not valid.

In another embodiment, the verifier 154 investigates the proof of attributes by sending a request to the purported source, issuer, or creator of the proof of attributes, receiving a documentation standard from the source, issuer, or creator, and comparing the proof of attributes to the documentation standard. If the verifier 154 determines that the proof of attributes meets the requirements specified by the documentation standard, then the proof of attributes is valid. If the verifier 154 determines that the proof of attributes does not meet the requirements specified by the documentation standard, then the proof of attributes is not valid. Examples of requirements specified by documentation standards include the dimensions, format, and type of content in the proof of attributes, such as the location of information within the proof of attributes, the font used by text printed on the proof of attributes, required signatures, the format and content of seals (raised or non-raised), holograms, the format and content of magnetic strips, or any portion, multiple, or combination thereof.

In an embodiment, the verifier 154 investigates the proof of attributes by comparing the proof of attributes to the physical characteristics of the user who has personally and physically appeared. For example, the verifier 154 may compare the physical appearance or measured values of the user to a photo in the proof of attributes, and/or compare the hair color, eye color, height, weight, age, or gender specified by the proof of attributes to the visual appearance or measured values of the user.

If the values specified in the proof of attributes match the appearance or measured values of the user and/or the proof of attributes meets the requirements specified by the documentation standard, then the verifier 154 determines that the proof of attributes is valid. But, if the values specified in the proof of attributes do not match the appearance or measured values of the user and/or the proof of attributes does not meet the requirements specified by the documentation standard, then the verifier 154 determines that the proof of attributes is not valid.

In response to the investigation of the proof of attributes, control then continues to block 1015 where the verifier determines whether the investigation of the proof of attributes determined that the proof of attributes is valid. If the determination at block 1015 is true, then the proof of attributes is valid, so control continues to block 1020 where the verifier 154 creates the digital certificate for a person 199. In an embodiment, the verifier creates the digital certificate for a person 199 by performing a cryptographic encryption cipher or process that uses the private key of the verifier, the public key of the user, and the user identifier as input and produces an encrypted digital signature as output. The verifier 154 then stores the public key of the user into the public key 705, the user identifier into the user identifier 710, the time period during which the digital certificate for a person 199 is valid into the validity period 715, and the generated encrypted digital signature into the digital signature 720. The verifier 154 then sends the digital certificate for the person 199 to the client computer system 132. The client computer system 132 receives and stores the digital certificate for the person 199.

Control then continues to block 1025 where, in response to the determination that the proof of attributes is valid, the verifier 154 stores the public key of the person 850 and the clear text GUID of the person 852 into records in the person database 158.

Control then continues to block 1030 where the verifier 154 determines, for each combination of attribute 854, logical operator 856, reference value 858 in the person database 158, whether the submitted values of the proof of attributes meet or satisfy the attributes. That is, the verifier 154 determines if the statement formed by the combination of the attribute identifier 854, the logical operator 856, and the reference value 858 evaluate to true when the user's value for the attribute (submitted in the proof of attributes) is substituted into the statement in place of the matching attribute 854. If the submitted value for an attribute that matches the attribute identifier 854 causes the statement formed by the attribute 854, the logical operator 856, and the reference value 858 to evaluate to true, then the verifier 154 stores an indication of true in the met flag 860 in the person database 158, indicating that the attribute is met or satisfied. If the submitted value for proof of attributes does not cause the statement formed by the attribute 854, the logical operator 856, and the reference value 858 to evaluate to true when the submitted value is substituted for the matching attribute 854, then the verifier 154 stores an indication of false in the met flag 860 in the person database 158, indicating that the attribute is not met. If the proof of attributes does not include a value for an attribute identifier 854, then the met flag 860 for that attribute identifier 854 is set to indicate false.

Since the attribute identifiers 854, logical operators 856, and reference values 858 in the person database 158 were created from the attributes 422 of the amalgamated group membership requirements 152, by storing indications of true or false in the met flag 860, the verifier is determining whether or not the values of the user's proof satisfy the attributes of the group membership requirements for all of the groups 151, regardless of whether the user has any intention of ever joining a particular group.

Control then continues to block 1032 where the verifier 154 sends an acceptance message to the client computer system 132, indicating that the proof of attributes are valid and have been accepted. The controller 196 receives the acceptance message and optionally displays or presents it via the I/O device 182. Control then continues to block 1099 where the logic of FIG. 10 returns.

If the determination at block 1015 is false, then the proof of attributes is not valid, so control continues to block 1035 where the verifier sends a rejection message to the client computer system 132, and the verifier does not create the person certificate, does not store the public key and clear text GUID into the person database, and does not set the met flag in the person database.

Control then continues to block 1040 where the controller 196 at the client computer system 132 receives the rejection message and displays or otherwise presents the rejection message via the I/O device 182. Control then continues to block 1099 where the logic of FIG. 10 returns.

Figure 11:
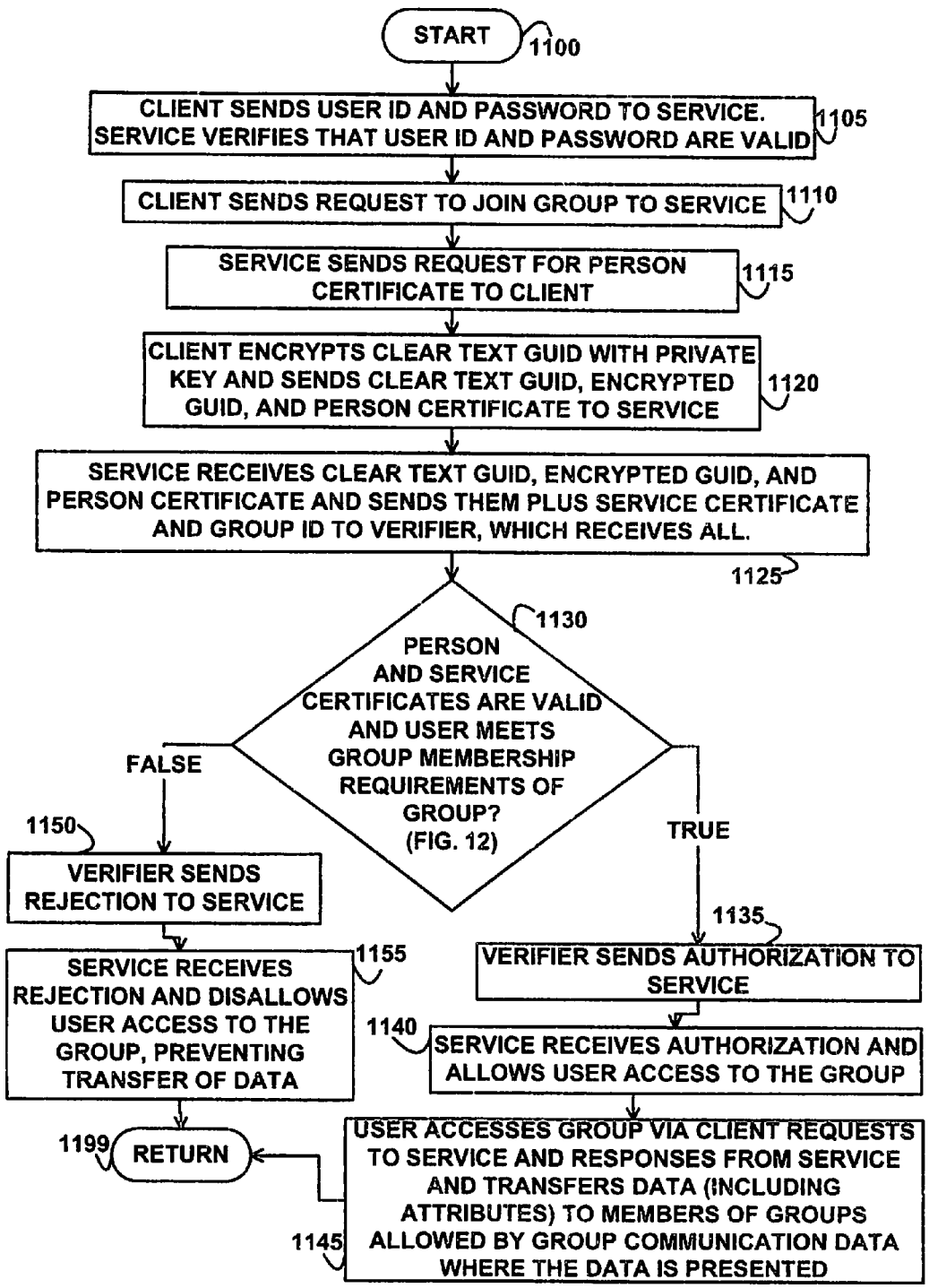
FIG. 11 depicts a flowchart of example processing for authorizing and rejecting requests for group access, according to an embodiment of the invention.

FIG. 11 depicts a flowchart of example processing for authorizing and rejecting requests for group access, according to an embodiment of the invention. Control begins at block 1100. Control then continues to block 1105 where the controller 196 at the client computer system 132 receives a command from a user via the I/O device 182. The command provides a user identifier (that identifies the user) and a password (owned by the user). In response to receiving the command, the controller 196 sends the user identifier (that identify the user) and password (owned by the user) to the service 150. The service 150 receives the user identifier and password and verifies that the user identifier and the password are valid.

Control then continues to block 1110 where the controller 196 at the client computer system 132 receives a command from the user via the I/O device 182 that requests joining a group, and in response, the controller 196 sends a command to the service 150, which includes a user identifier and a group identifier. The command requests that the user at the client computer system 132 be allowed to join or become a member of the group, be allowed to access the group, and/or be allowed to transfer data and/or requests to and from the group and/or other users who are members of the group.

Control then continues to block 1115 where the service 150 receives the command, and in response, the service 150 sends a request to the client computer system 132, which requests a digital certificate for a person 199 for the user. Control then continues to block 1120 where, the controller 196 at the client computer system 132 receives the request for the digital certificate for a person 199 and in response, the controller 196 at the client computer system 132 encrypts the clear text GUID 190 with the private key 192 into the encrypted GUID 198 via a cryptographic encryption cipher or process, and the controller 196 sends the clear text GUID 190, the encrypted GUID 198, and the digital certificate for a person 199 to the service 150.

Control then continues to block 1125 where the service 150 receives the clear text GUID 190, the encrypted GUID 198, and the digital certificate for a person 199 from the controller 196 at the client computer system 132, and in response to the receipt, the service 150 sends the clear text GUID 190, the encrypted GUID 198, the digital certificate for a person 199, the digital certificate for a service 156, and the group identifier to the verifier 154. The verifier 154 receives the clear text GUI 190, the encrypted GUID 198, the digital certificate for a person 199, the digital certificate for a service 156, and the group identifier from the service 150.

Figure 12:
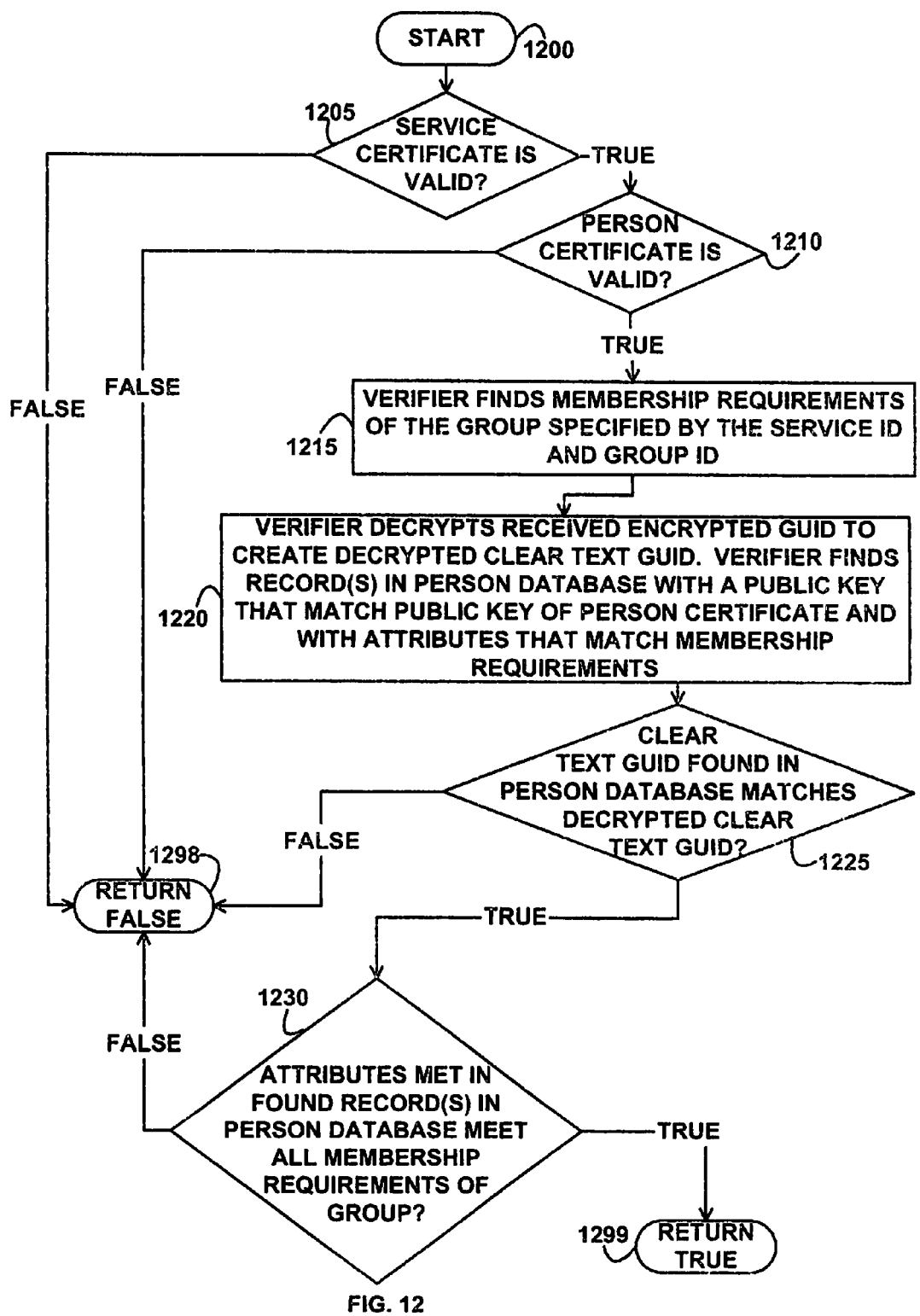
FIG. 12 depicts a flowchart of example processing for determining whether group membership requirements are met, according to an embodiment of the invention.

Control then continues to block 1130, where (in response to the receipt of the clear text GUI 190, the encrypted GUID 198, the digital certificate for a person 199, the digital certificate for a service 156, and the group identifier from the service 150), the verifier 154 determines whether the digital certificate for a person 199 and the digital certificate for a service 156 are valid and determines whether the user meets the group membership requirements 152 for the group that is identified by the received group identifier, as further described below with reference to FIG. 12.

If the determination of block 1130 is true, then the digital certificate for a person 199 is valid, the digital certificate for a service 156 is valid, and the proven attribute values for the user meet the group membership requirements 152 of the group 151, so control continues to block 1135 where the verifier 154 sends authorization message to the service 150. In an embodiment, the verifier 154 does not send any of the values of the user's attributes to the service. Thus, the service 150 and any group members that may transfer data to/from a user do not necessarily know the identity of the user or any information that describes the user. Instead, the service and other group members know that the proven attribute values of the user meet the group membership requirements 152.

Control then continues to block 1140 where the service 150 receives the authorization message from the verifier 154, and in response, the service 150 allows or grants the user at the client computer system 132 access to the group 151; the service 150 adds the user as a member to the group 151; the service 150 allows the user to send and receive data to/from the group 151 or users who are members of the group 151 or users who are members of other groups that are allowed to communicate with the group, as specified by the group communication data 153; the service 150 transfers data from the user to the group and/or to other group members or members of other groups, as specified as allowed by the group communication data 153; and/or the service 150 transfers data to the user from the group, from other group members, and/or from members of other groups, as specified as allowed by the group communication data 153. The service 150 further sends a notification of that grant of access to the controller 196 at the client computer system 132, which receives the grant of access.

Control then continues to block 1145 where, in response to the grant of access, the controller 196 at the client computer system 132 transfers data and/or requests, on behalf of the user at the client computer system 132, to and from the group 151, the service 150, and/or other client computer systems representing other users who are also members of the group, and/or other client computer systems representing other users who are members of other groups 510 that are allowed to communicate with the group 508, while preventing transfer of data to other groups that are not specified by the communicate group field 510 in the record of the group communication data 153 that has a group identifier 508 that matches the group to which the user was granted access. The controller 196 displays or presents the received data and/or sent data via the I/O device 182, as previously described above with reference to FIGS. 3A and 3B. The service 150 further sends information describing the group membership requirements that are met to the controller 196, which optionally displays the met membership requirements, e.g., as the messages 310-1, 310-2, and 310-3 (FIGS. 3A and 3B). Control then continues to block 1199 where the logic of FIG. 11 returns.

If the determination of block 1130 is false, then the digital certificate for a person 199 is not valid, the digital certificate for a service 156 is not valid, or the user's attribute values do not meet the group membership requirements 152 of the group 151, so control continues to block 1150 where the verifier 154 sends a rejection notification to the service 150, indicating that the user is not to be allowed become a member of or access the group 151. Control then continues to block 1155 where the service 150 receives the rejection notification, and in response to the receipt of the rejection notification, the service 150 disallows or prevents the user from accessing or becoming a member of the group 151, meaning that the client computer system 132 is not allowed to transfer data and/or requests, on behalf of the user at the client computer system 132, to and from the group 151, the service 150, and/or other client computer systems representing other users who are members of the group. Control then continues to block 1199 where the logic of FIG. 11 returns.

FIG. 12 depicts a flowchart of example processing for determining whether group membership requirements are met and whether a digital certificate for a person and a digital certificate for a service are valid, according to an embodiment of the invention. Control begins at block 1200.

Control then continues to block 1205 where the verifier 154 determines whether the digital certificate for a service 156 is valid. In an embodiment, the verifier 154 determines whether the digital certificate for a service 156 is valid by performing a cryptographic decryption cipher or process that uses the public key of the verifier and the encrypted digital signature 620 as input. The verifier 154 compares the output of the cryptographic decryption cipher or process to the public key 605 owned by the service and the service identifier 610. If the output of the cryptographic decryption cipher or process matches the public key 605 and the service identifier 610 and the current time and date is within the validity time period 615, then the digital certificate for the service 156 is valid. If the output of the cryptographic decryption cipher or process does not match the public key 605 and the service identifier 610 and the current time and date is not within the validity time period 615, then the digital certificate for the service 156 is not valid.

If the determination at block 1205 is true, then the digital certificate for a service 156 is valid, so control continues to block 1210 where the verifier 154 determines whether the digital certificate for a person 199 is valid. In an embodiment, the verifier 154 determines whether the digital certificate for a person 199 is valid by performing a cryptographic decryption cipher or process that uses the public key of the verifier and the encrypted digital signature 720 as input. The verifier 154 compares the output of the cryptographic decryption cipher or process to the public key 705 and the user identifier 710. If the output of the cryptographic decryption cipher or process matches the public key 705 and matches the user identifier 710 and the current time and date is within the validity time period 715, then the digital certificate for the person 199 is valid. If the output of the cryptographic decryption cipher or process does not match the public key 705 and the user identifier 710 or the current time and date is not within the validity time period 715, then the digital certificate for the person 199 is not valid.

If the determination at block 1210 is true, then the digital certificate for the person 199 is valid, so control continues to block 1215 where the verifier 154 finds the group membership requirements for the service and group. That is, the verifier 154 finds the attributes 422 in the records of the group membership requirements 152 that have a service identifier 418 that matches the service identifier 610 in the digital certificate 156 and that have a group identifier 420 that matches the group identifier that was received from the controller 196 at the client computer system 132 with the command that requested group access.

Control then continues to block 1220 where the verifier 154 decrypts the encrypted GUID, which was previously received from the client computer system 132, as described above, and that cryptographic decryption process creates a decrypted clear text GUID. In response to the cryptographic decryption process, the verifier 154 finds, determines, or selects those record(s) in the person database 158 that have a public key for a person 850 that match the public key 705 in the digital certificate for a person 199 and that have attributes (an attribute identifier 854, a logical operator 856, and a reference value 858) that match the attributes 422 that were previously found to be the group membership requirements associated with the service and group.

Control then continues to block 1225 where the verifier 154 determines whether the clear text GUID 852 in all of the found record(s) (found by block 1220) in the person database 158 match the decrypted clear text GUID (previously decrypted at block 1220, as described above). If the determination at block 1225 is true, then the clear text GUID 852 in all of the found record(s) in the person database 158 match the decrypted clear text GUID, so control continues to block 1230 where the verifier 154 determines whether all of the attributes in the found records in the person database meet all of the group membership requirements. That is, the verifier determines whether the met flag 860 is set to an indication of true in all of the found records and that the found records in the person database 158 have the attributes 854, the logical operators 856, and the reference values 858 that correspond to, or match, each and every attribute 422 in the group membership requirements 152 with a service identifier 418 and group identifier 420 that match the requesting service and specified group of which the user desires to join or become a member.

If the determination at block 1230 is true, then all of the attributes in the found records in the person database meet all of the group membership requirements, so control continues to block 1299 where the logic of FIG. 12 returns an indication of true to the invoker of the logic of FIG. 12, indicating that the digital certificate for the service 156 is valid, the digital certificate of the person 199 is valid, and that the values of the user's attributes meet all of the group membership requirements 152 necessary to become a member of the group 151.

If the determination at block 1230 is false, then all of the attributes in the found records in the person database do not meet all of the group membership requirements, so control continues to block 1298 where the logic of FIG. 12 returns an indication of false to the invoker of the logic of FIG. 12.

If the determination at block 1225 is false, then the clear text GUID 852 in at least one found record does not match the decrypted clear text GUID, so control continues to block 1298 where the logic of FIG. 12 returns an indication of false to the invoker of the logic of FIG. 12.

If the determination at block 1210 is false, then the digital certificate for the person 199 is not valid, so control continues to block 1298 where the verifier 154 returns false to the invoker of the logic of FIG. 12, indicating that the digital certificate for a person is invalid.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   receiving membership requirements for a first group, wherein the membership requirements are identical for all of a plurality of members of the first group, and wherein the membership requirements do not uniquely identify the plurality of members of the first group;
   receiving a proof of an attribute value from a first user;
   verifying whether the proof of the attribute value meets the membership requirements, wherein the verifying further comprises comparing the proof of the attribute value in a photo to a physical appearance of the first user;
   adding the first user as a first member of the first group if the proof of the attribute value meets the membership requirements; and
   preventing the first user from joining the first group if the proof of the attribute value does not meet the membership requirements;
   in response to the receiving the membership requirements, creating a service digital certificate and sending the service digital certificate to a service; and
   if the proof of the attribute value is valid, creating a person digital certificate and sending the person digital certificate to the first user.

2. The method of claim 1, wherein the attribute value describes the first user.

3. The method of claim 1, wherein the membership requirements further comprise an identifier of an attribute, a logical operator, and a reference value.

4. The method of claim 3, wherein the verifying further comprises:
   verifying whether a statement formed by the attribute value, the logical operator, and the reference value evaluates to true.

5. The method of claim 1, further comprising:
   receiving a command, wherein the command comprises a request for the first user to join the first group;
   receiving the person digital certificate and the service digital certificate; and
   in response to the receiving the command and the receiving the person digital certificate and the service digital certificate, performing the adding, wherein the adding further comprises adding the first user as the first member of the first group if the proof of the attribute value is valid, if the attribute value meets the membership requirements, if the person digital certificate is valid, and if the service digital certificate is valid.

6. The method of claim 5, further comprising:
   in response to the receiving the command and in response to the adding, transferring data between the first user and other members of the first group.

7. A non-transitory storage medium encoded with instructions, wherein the instructions when executed comprise:
   receiving membership requirements for a first group from a service, wherein the membership requirements are identical for all of a plurality of members of the first group, and wherein the membership requirements do not uniquely identify the plurality of members of the first group;
   receiving a proof of an attribute value from a first user;
   verifying whether the proof of the attribute value meets the membership requirements, wherein the verifying further comprises comparing the proof of the attribute value in a photo to a physical appearance of the first user;
   adding the first user as a first member of the first group if the proof of the attribute value meets the membership requirements;
   preventing the first user from joining the first group if the proof of the attribute value does not meet the membership requirements;
   in response to the receiving the membership requirements, investigating the service, creating a service digital certificate and sending the service digital certificate to the service; and
   if the proof of the attribute value is valid, creating a person digital certificate and sending the person digital certificate to the user.

8. The non-transitory storage medium of claim 7, wherein the membership requirements further comprise an identifier of an attribute, a logical operator, and a reference value, and wherein the verifying further comprises:
   verifying whether a statement formed by the attribute value, the logical operator, and the reference value evaluates to true.

9. The non-transitory storage medium of claim 7, wherein the instructions further comprise:
   receiving a command, wherein the command comprises a request for the first user to join the first group;
   receiving the person digital certificate and the service digital certificate; and
   in response to the receiving the command and the receiving the person digital certificate and the service digital certificate, performing the adding, wherein the adding further comprises adding the first user as the first member of the first group if the proof of the attribute value is valid, if the attribute value meets the membership requirements, if the person digital certificate is valid, and if the service digital certificate is valid.

10. The non-transitory storage medium of claim 9, wherein the instructions further comprise:
    in response to the receiving the command and in response to the adding, transferring data between the first user and other of the plurality of members of the first group.

11. The non-transitory storage medium of claim 9, wherein the instructions further comprise:

in response to the receiving the command and in response to the adding, transferring data between the first user and members of a second group if allowed by the second group.

12. A computer system comprising:

a processor; and memory connected to the processor, wherein the memory encodes instructions that when executed by the processor comprise:

receiving membership requirements for a first group from a service, wherein the membership requirements are identical for all of a plurality of members of the first group, and wherein the membership requirements do not uniquely identify the plurality of members of the first group, receiving a proof of an attribute value from a first user, verifying whether the proof of the attribute value is valid and meets the membership requirements, wherein the verifying further comprises comparing the proof of the attribute value in a photo to a physical appearance of the first user, receiving a command, wherein the command comprises a request for the first user to join the first group, in response to the receiving the command, adding the first user as a first member of the first group if the proof of the attribute value is valid and meets the membership requirements, preventing the first user from joining the first group if the proof of the attribute value is invalid or does not meet the membership requirements, in response to the receiving the membership requirements, investigating the service, creating a service digital certificate, and sending the service digital certificate to the service, and if the proof of the attribute value meets a documentation standard, creating a person digital certificate and sending the person digital certificate to the user.

13. The computer system of claim 12, wherein the membership requirements further comprise an identifier of an attribute, a logical operator, and a reference value, and wherein the verifying further comprises:

verifying whether a statement formed by the attribute value, the logical operator, and the reference value evaluates to true.

14. The computer system of claim 12, wherein the instructions further comprise:

receiving the person digital certificate and the service digital certificate; and in response to the receiving the command and the receiving the person digital certificate and the service digital certificate, performing the adding, wherein the adding further comprises adding the first user as the first member of the first group if the proof of the attribute value is valid, if the proof of the attribute value meets the membership requirements, if the person digital certificate is valid, and if the service digital certificate is valid.

15. The computer system of claim 14, wherein the instructions further comprise:

in response to the receiving the command and in response to the adding, transferring data between the first user and other of the plurality of members of the first group.

16. The computer system of claim 14, wherein the instructions further comprise:

in response to the receiving the command and in response to the adding, transferring data between the first user and members of a second group if allowed by the second group.

17. The computer system of claim 12, wherein the instructions further comprise:

if the proof of the attribute value meets the membership requirements, storing a public key of user, an associated clear text identifier of the user, and an associated indication that the membership requirements are met.

18. The computer system of claim 17, wherein the adding further comprises:

receiving an encrypted identifier of the user;

decrypting the encrypted identifier to create a decrypted clear text identifier; and verifying that the decrypted clear text identifier matches the associated clear text identifier.

* * * * *